Figure 1:
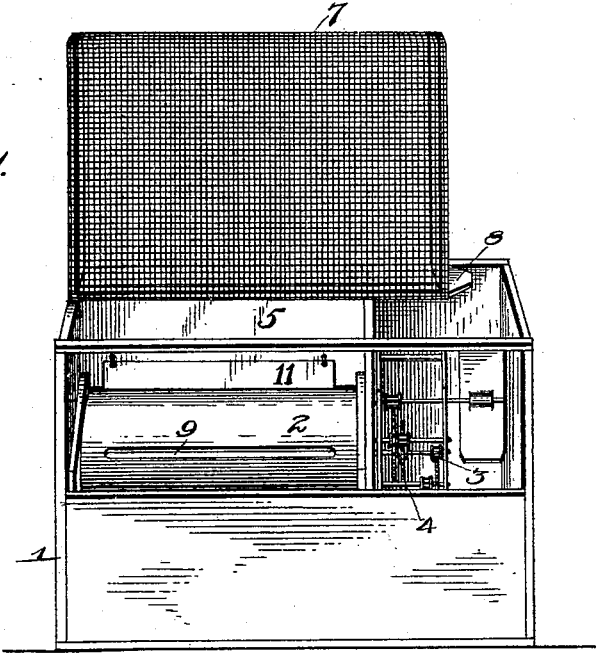

No. 620,292. Patented Feb. 28, 1899.
M. S. FEATHERSTONE.
AUTOMATIC FLY TRAP.
(Application filed Oct. 11, 1898.)
(No Model.)

Witnesses

Inventor
M. S. Featherstone,
by H. B. Willson & Co.
Attorneys

THE NORRIS PETERS CO., PHOTO-LITHO., WASHINGTON, D. C.

UNITED STATES PATENT OFFICE.

MATTHIAS SLY FEATHERSTONE, OF GOSHEN, CALIFORNIA.

AUTOMATIC FLY-TRAP.

SPECIFICATION forming part of Letters Patent No. 620,292, dated February 28, 1899.

Application filed October 11, 1898. Serial No. 693,245. (No model.)

*To all whom it may concern:*

Be it known that I, MATTHIAS SLY FEATHERSTONE, a citizen of the United States, residing at Goshen, in the county of Tulare and State of California, have invented certain new and useful Improvements in Automatic Fly-Traps; and I do declare the following to be a full, clear, and exact description of the invention, such as will enable others skilled in the art to which it appertains to make and use the same.

My invention relates to improvements in automatic fly-traps; and the object is to provide a simple, inexpensive, and effective device for this purpose.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention as set forth in the claim at the end of this specification.

The same reference characters indicate the same parts of the invention.

Figure 2:
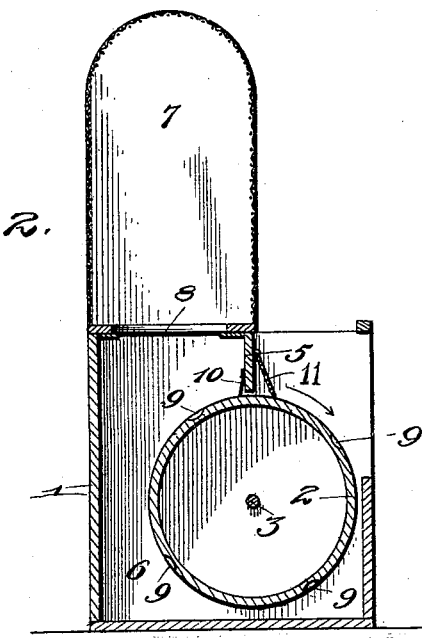

Figure 1 is a perspective view of my improved fly-trap. Fig. 2 is a transverse section of the same.

1 denotes the case, and 2 a horizontal cylinder or drum fixed on a shaft 3, suitably journaled in the case and adapted to be continuously rotated by the spring-actuated train of gearing 4 in the direction of the arrow shown in Fig. 2.

5 denotes a vertical partition which extends down so as to lightly touch or almost touch the cylinder, and this partition, with the contiguous walls of the case, forms a comparatively dark chamber 6, closed on all sides except the top, which is open and above which is the removable cage 7. The bottom of the cage is provided with a removable slide 8, which is withdrawn when the cage is in position, so as to allow an unobstructed communication between the chamber 6 and the cage.

The cylinder is formed with a series of pockets 9 9, in which the lure or bait is fixed. This bait may consist of molasses, sugar, or the like substance to attract the flies, and as the cylinder revolves slowly the flies are carried into the chamber 6, whence they arise, attracted by the light, into the cage 7, and when a sufficient number have been trapped the slide 8 is inserted to close the cage, which is then removed and the flies disposed of.

10 10 denote a row of bristles fixed in the chamber 6 to dislodge the flies from the bait before it leaves the chamber 6, should any remain.

11 designates a sheet-metal apron hinged to the front side of the partition 5, so as to rest lightly on the drum, and when the latter is revolving the lower edge of the apron will drop down into the bait-recesses and drive back any flies that may have remained in them.

Having thus fully described my invention, what I claim as new and useful, and desire to secure by Letters Patent of the United States, is—

In combination, the casing formed with the chamber 6, the continuously-rotating drum formed with the bait-recesses and extending part way into said chamber, the partition 5, the apron 11 hinged to said partition and having its free edge resting on the drum, and the removable cage 7, communicating with said chamber, substantially as set forth.

In testimony whereof I have hereunto set my hand in presence of two subscribing witnesses.

MATTHIAS SLY FEATHERSTONE.

Witnesses:
 JAMES H. BLISS,
 H. C. KERN.